United States Patent
Smith

(10) Patent No.: US 6,417,981 B1
(45) Date of Patent: *Jul. 9, 2002

(54) SYSTEM AND METHOD FOR MEASURING ABSOLUTE TRANSDUCER-MEDIUM CLEARANCE USING A THERMAL RESPONSE OF AN MR TRANSDUCER

(75) Inventor: Gordon James Smith, Rochester, MN (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/401,688

(22) Filed: Sep. 23, 1999

(51) Int. Cl.[7] ............................................... G11B 21/02
(52) U.S. Cl. ............................ 360/75; 360/31; 360/25
(58) Field of Search ........................ 360/75, 46, 77.03, 360/25, 73.03, 39, 31

(56) References Cited

U.S. PATENT DOCUMENTS

| | | | | |
|---|---|---|---|---|
| 5,305,301 A | | 4/1994 | Ohga | 369/275.3 |
| 5,309,301 A | * | 5/1994 | Gregory et al. | 360/137 |
| 5,412,519 A | * | 5/1995 | Buettner et al. | 360/73.03 |
| 5,739,972 A | * | 4/1998 | Smith et al. | 360/73.03 |
| 5,751,510 A | * | 5/1998 | Smith et al. | 360/77.08 |
| 6,088,176 A | * | 7/2000 | Smith et al. | 360/46 |
| 6,239,936 B1 | * | 5/2001 | Abraham et al. | 360/75 |

* cited by examiner

Primary Examiner—David Hudspeth
Assistant Examiner—K. Wong
(74) Attorney, Agent, or Firm—Mark A. Hollingsworth

(57) ABSTRACT

A method and apparatus for measuring absolute clearance between a magnetoresistive (MR) transducer and a moving medium utilizes a transduced signal that varies as a function of transducer-medium clearance. The medium may be devoid of, or include, magnetic information. The velocity of the medium is reduced relative to the MR transducer, and a rate of change of the signal is monitored. Using data associated with the rate of change of the signal during spindown, absolute clearance between the MR transducer and the medium is computed for a nominal medium-transducer velocity, such as a full operational velocity. Computing absolute transducer-medium clearance involves determining a transition velocity at which the rate of change of the signal exceeds a pre-established threshold. Computing absolute clearance may further involve associating the transition velocity with an absolute clearance value obtained using a clearance profile associated with the MR transducer. The clearance profile may be representative of a relationship between landing or take-off velocity of the MR transducer and associated transducer-medium clearance. The transition velocity is used to compute the absolute clearance between the MR transducer and the medium for a nominal medium-transducer velocity.

36 Claims, 8 Drawing Sheets

SYSTEM AND METHOD FOR MEASURING ABSOLUTE TRANSDUCER-MEDIUM CLEARANCE USING A THERMAL RESPONSE OF AN MR TRANSDUCER

FIELD OF THE INVENTION

The present invention relates generally to data storage systems and, more particularly, to a system and method for measuring absolute clearance between a magnetoresistive transducer and a medium using a thermal response of the MR transducer.

BACKGROUND OF THE INVENTION

In many applications, it is desirable to ascertain the clearance or spacing between an MR transducer and a data storage disk. By way of example, an unexpected change in head-disk clearance of a particular head is generally indicative of a problem with the head or head assembly. An appreciable decrease in head-disk clearance by one head of a disk drive system relative to other heads may be indicative of a suspect head.

One known method for determining head-disk clearance is referred to as a Harmonic Ratio Flyheight (HRF) clearance test. A HRF testing approach typically requires employment of a dedicated tester which may take several minutes to complete HRF testing of a disk drive. A HRF testing approach, as well as other known flyheight evaluation techniques, require that dedicated tracks of magnetic information be available over which each of the heads must pass with relative high precision in order to obtain an accurate head flying height measurement. Accordingly, such known flyheight measuring approaches require the presence of a previously recorded magnetic pattern on the disk.

Moreover, present HRF measurement techniques are very sensitive to off-track deviations. By way of example, approximately one-half of the time required to perform a HRF measurement during manufacturing involves accurately locating the centerline of the dedicated magnetic test track. Further, HRF testing data becomes highly inaccurate when the low pole frequency of the arm electronics (AE) is near HRF readback frequencies. In such cases, additional attenuation may cause HRF clearance measurement errors in excess of 50 nanometers (nm) for some disk drive systems. Although such attenuation and may be compensated for if the AE low frequency pole can be accurately estimated, known approaches for accurately estimating the AE low frequency pole are problematic for a variety of reasons.

Other known head flyheight evaluation techniques involve the use of the thermal response of an MR head. Reference is made to co-owned U.S. Pat. No. 5,751,510 which discloses techniques concerning the identification, processing, and uses of the thermal signal component of a readback signal, including head flyheight evaluation. U.S. Pat. No. 5,751,510 is hereby incorporated herein by reference in its entirety.

The thermal response of an MR head is particularly useful when evaluating disk topography variations. Techniques that exploit the thermal response of the MR head for purposes of determining head flyheight generally require that the disk be operated at a fixed speed, and generally rely on various calibration or normalization methods so that the thermal response of the MR head is useable. Although such techniques provide for an accurate representation of relative head-disk spacing, such known methods that utilize the thermal response of an MR head are generally not capable of providing an estimate as to absolute head-disk clearance.

There exists a need in the data storage system manufacturing community for an apparatus and method for measuring absolute head-disk clearance at the time of manufacturing and, importantly, during subsequent use in the field. There exists a further need for an apparatus and method for detecting absolute head-disk clearance without the need for dedicated test tracks. There exists yet a further need to provide such an apparatus and method which is suitable for incorporation into existing data storage systems, as well as into new system designs, and one that operates fully autonomously in-situ a data storage system. The present invention is directed to these and other needs.

SUMMARY OF THE INVENTION

The present invention is directed to an apparatus and method for measuring absolute clearance between a magnetoresistive transducer and a medium which moves relative to the MR transducer. The medium may be devoid of magnetic information or may include magnetic information. In accordance with the principles of the present invention, a signal is produced using an MR element of the MR transducer, such that the signal varies as a function of clearance between the MR element and the medium. The signal comprises a thermal component representative of a thermal response of the MR element.

The velocity of the medium is reduced relative to the MR transducer. While reducing the medium-transducer velocity, the rate of change of the signal produced by the MR transducer is monitored. Using data associated with the rate of change of the signal during spindown, absolute clearance between the MR transducer and the medium is computed for a nominal medium-transducer velocity, such as a full operational velocity.

Computing the absolute clearance between the MR transducer and the medium may further involve determining a transition velocity at which the rate of change of the signal exceeds a pre-established threshold. The transition velocity is used to compute the absolute clearance between the MR transducer and the medium for a nominal medium-transducer velocity. In one embodiment, for example, a transition velocity represents a medium-transducer velocity at which the rate of change of the signal exceeds the pre-established threshold by about 10% or more.

The transition velocity is representative of a medium-transducer velocity at which the heat transfer behavior of the MR transducer assembly transitions from a first thermal transport mechanism to a second thermal transport mechanism. The transition velocity coincides with a medium-transducer velocity at which appreciable contact occurs between the transducer and the medium.

Computing absolute clearance between the MR transducer and medium may further involve associating a transition velocity, at which the rate of change of the signal exceeds the pre-established threshold, with an absolute clearance value obtained using a clearance profile associated with the MR transducer. For example, the clearance profile may be representative of a relationship between landing or take-off velocity of the MR transducer and associated transducer-medium clearance.

Monitoring the rate of change of the signal produced by the MR element involves performing a plurality of rate of change or slope computations using the signal to establish the pre-established threshold. The signal produced by the MR element may be representative of a resistance of the MR element that varies as a function of transducer-medium clearance. The signal may alternatively be representative of a voltage across the MR element that varies as a function of transducer-medium clearance. During the absolute transducer-medium clearance measurement procedure, the MR element may be biased using a constant current.

According to another embodiment of the present invention, the thermal spindown technique for measuring absolute transducer-medium clearance may also be employed to evaluate lubricity between a slider that supports the MR transducer and the medium. According to this embodiment, the transition velocity at which the rate of change of the signal produced by the MR transducer exceeds a pre-established threshold is determined. The state of lubricity between a slider that supports the MR transducer and the medium may then be determined using the rate of change of the signal for medium-transducer velocities lower than the transition velocity.

The rate of change signal samples acquired for medium-transducer velocities lower than the transition velocity may be characterized in terms of a curve having a given slope. The slope of the curve is related to the state of the temperature profile of slider/MR transducer. If the slope of such a curve is appreciably greater than the slope of previously computed curves for the same slider assembly, the resulting increase in slider/medium frictional heating may be due to insufficient provision of a lubricant between the slider and medium.

According to a further embodiment of the present invention, a surface profile or crown of a slider may be characterized be evaluating the slope of a curve developed using rate of change signal samples acquired for medium-transducer velocities lower than the transition velocity. A transition velocity at which the rate of change of the signal exceeds a pre-established threshold is determined. Since the slope of this curve may also be viewed as a function of the configuration of the slider crown, a surface profile of the slider may be characterized by evaluating changes in the slope of the curve relative to previously computed curves for the same slider.

In accordance with yet another embodiment, information acquired during the thermal spindown procedure may be used to adjust the medium-transducer velocity or a characteristic of a particular slider in order to maintain a desired clearance between the slider and the medium. Slider preload or pitch angle, for example, may be adjusted, alone or in combination with a medium-transducer velocity, to maintain a given slider at a desired flyheight relative to the medium.

An apparatus for measuring absolute clearance between a slider and a medium moving relative to the slider according to the principles of the present invention includes an MR transducer comprising an MR element which is supported by the slider. The MR transducer produces a signal that varies as a function of clearance between the MR element and the medium. The signal comprises a thermal component representing a thermal response of the MR element. The apparatus includes a controller that controls a velocity of the medium relative to the slider, and, in particular, reduces the velocity of the medium relative to the slider during the absolute clearance measurement procedure.

A processor, which is coupled to the controller and MR transducer, computes a rate of change of the signal during reduction of the medium-slider velocity and determines a medium-slider threshold velocity at which the rate of change of the signal exceeds a pre-established established threshold. The processor determines, for a nominal medium-slider velocity, absolute clearance between the slider and the medium using the threshold velocity and a clearance profile associated with the slider.

The processor performs a number of rate of change computations using the signal to establish the pre-established threshold. The transition velocity is representative of a medium-slider velocity at which the rate of change of the signal exceeds the pre-established threshold by about 10 percent or more. An apparatus for measuring absolute clearance between a slider and a medium moving relative to the slider according to the principles of the present invention may be incorporated in a data storage system, such as a direct access storage device (DASD), or a test apparatus.

The apparatus may further include a programmable filter, which is coupled to the processor, that filters the rate of signal change computations produced by the processor. In one embodiment, the programmable filter comprises a finite impulse response (FIR) filter. The programmable filter may be programmed to perform a least-squares linear fit or other type of curve fitting technique using the rate of signal change computations produced by the processor.

The processor may also determine a state of lubricity between the slider and the medium using rate of signal change data acquired for medium-slider velocities lower than the transition velocity. The processor may further characterize a surface profile of the slider using rate of signal change data for medium-slider velocities lower than the transition velocity. In another embodiment, the processor cooperates with the controller to adjust the medium-slider velocity or a characteristic of the slider to maintain a desired clearance between the slider and the medium.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1:
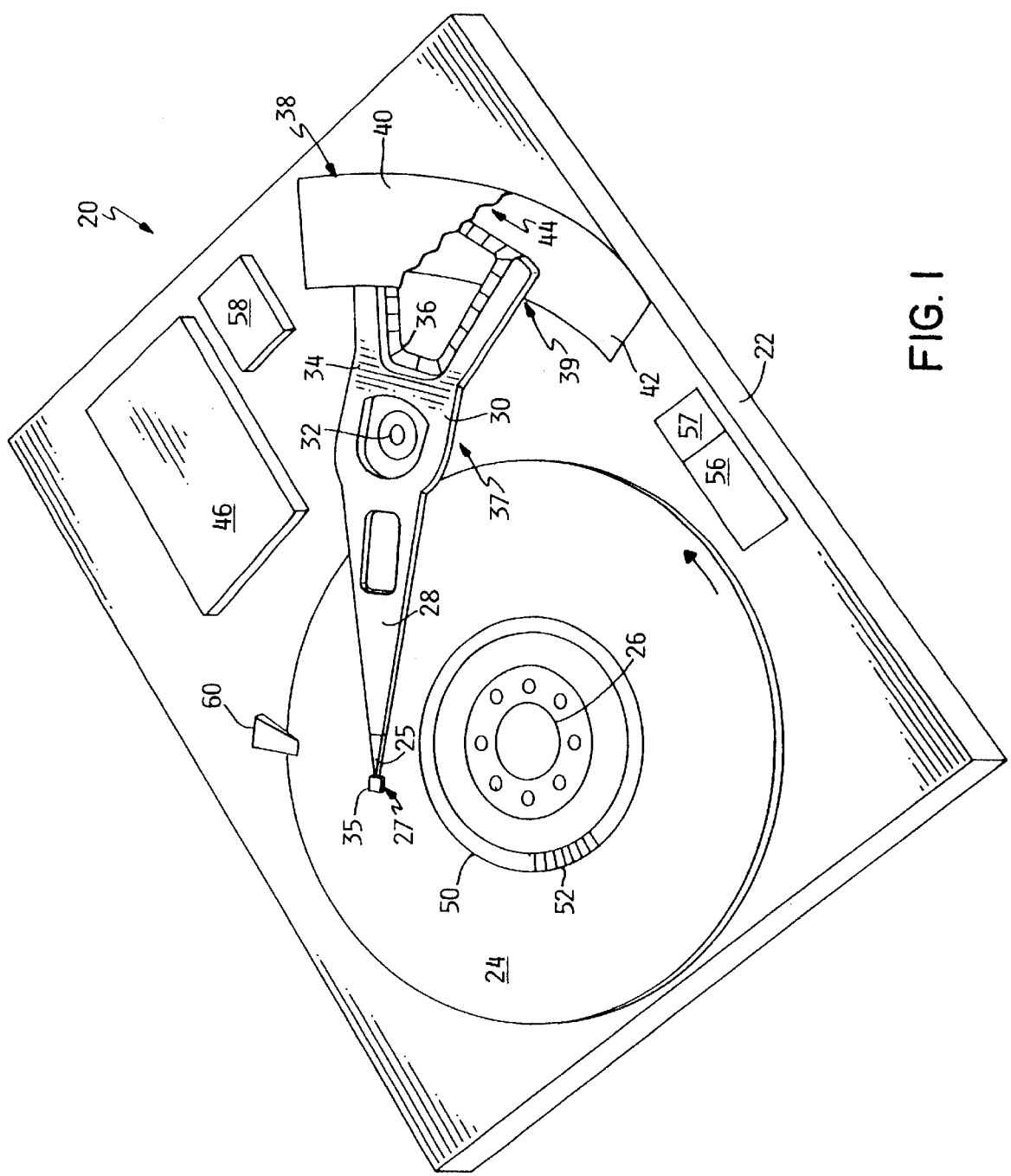
FIG. 1 is a top perspective view of a disk drive system with its upper housing cover removed.

While the invention is amenable to various modifications and alternative forms, specifics thereof have been shown by way of example in the drawings and will be described in detail hereinbelow. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF VARIOUS EMBODIMENTS

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

An absolute head-disk clearance measurement methodology of the present invention may be implemented to estimate the absolute clearance between an MR element and a medium which is moving relative to the MR element. Various embodiments of the present invention contemplate use of the disclosed methodology in an apparatus that employs a slider, upon which an MR element is supported, and a rotatable medium, such as a disk substrate.

A significant advantage of the present invention concerns the ability to perform absolute head-medium clearance measurements for disks that are devoid of a magnetic coating or magnetic information. As such, absolute head-medium clearance measurements according to the principles of the present invention may be performed using disk blanks, such as glass, ceramic or aluminum polished or unpolished disk substrates, for example.

The following system description contemplates employment of an absolute head-medium clearance measurement methodology according to the present invention in the context of a disk drive system that includes one or more magnetizable disks. It is to be understood that the systems and methods described herein are provided for illustrative purposes only, and are not to be regarded as limiting embodiments.

Figure 2:
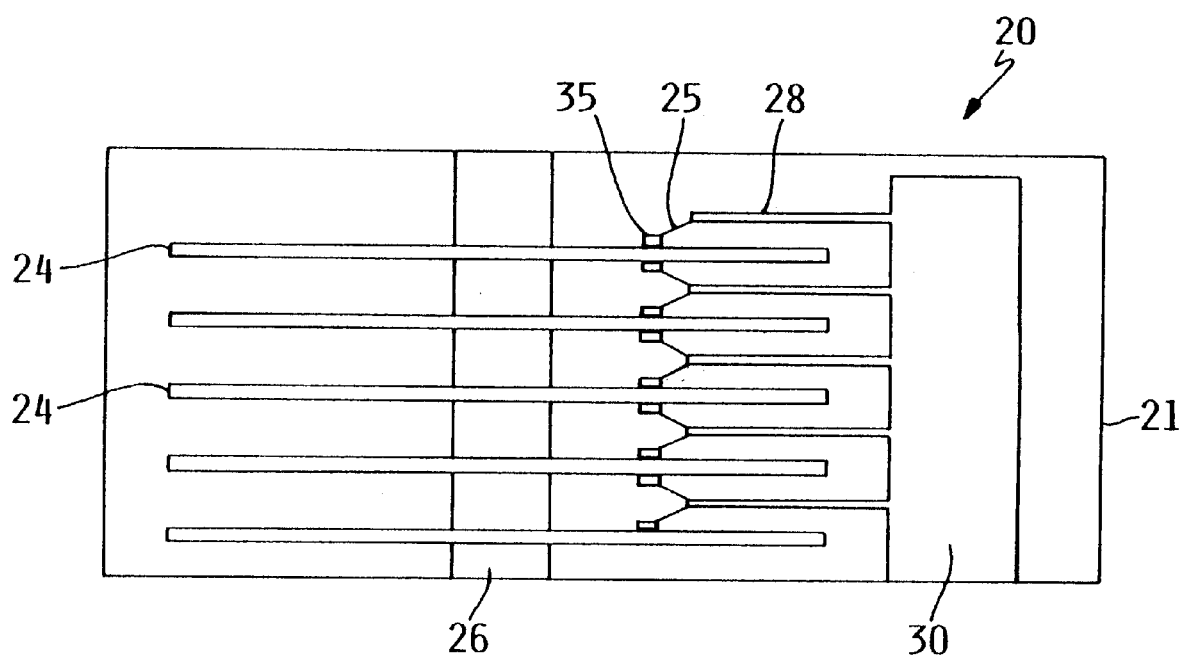
FIG. 2 is a side plan view of a disk drive system comprising a plurality of data storage disks.

Referring to the drawings, and more particularly to FIGS. 1 and 2, there is illustrated a data storage system 20 within which an absolute head-disk clearance measurement methodology of the present invention may be implemented. The disk drive system 20, as is best shown in FIG. 2, typically includes one or more rigid data storage disks 24 which are stacked coaxially in a tandem spaced relationship, and rotate about a spindle motor 26 at a relatively high rate of rotation.

As is depicted in FIG. 1, each disk 24 is typically magnetically formatted to include a plurality of spaced concentric tracks 50. One or more of the disks 24 may alternatively be magnetically formatted to include a spiraled track configuration, or a combination of concentric and spiraled track configurations. Digital information is typically stored in the form of magnetic transitions along the tracks 50. The tracks 50 are generally divided into a number of sectors 52, with each sector 52 comprising a number of information fields, including fields for storing data, and sector identification and synchronization information, for example.

Writing data to a magnetic data storage disk 24 generally involves passing a current through the write element of the transducer assembly 27 to produce magnetic lines of flux which magnetize a specific location of the disk surface 24. Reading data from a specified disk location is typically accomplished by a read element of the transducer assembly 27 sensing the magnetic field or flux lines emanating from the magnetized locations of the disk surface 24. As the read element passes over the rotating disk surface 24, the interaction between the read element and the magnetized locations on the disk surface 24 results in the production of electrical signals, commonly referred to as readback signals, in the read element.

An actuator 30 typically includes a number of interleaved actuator arms 28 with each arm having one or more transducer 27 and slider assemblies 35 mounted to a load beam 25 for transferring information to and from the data storage disks 24. The slider 35 is typically designed as an aerodynamic lifting body that lifts the transducer 27 off the surface of the disk 24 as the rate of spindle motor rotation increases and causes the transducer 27 to hover above the disk 24 on an airbearing produced by high speed rotation of the disk 24. The distance between the slider 35 and the disk surface 24, which is typically on the order of 30–100 nanometers (nm), is commonly referred to as head-disk clearance or spacing.

The actuator 30 is typically mounted to a stationary actuator shaft 32 and rotates on the shaft 32 to move the actuator arms 28 into and out of the stack of data storage disks 24. A coil assembly 36, mounted to a coil frame 34 of the actuator 30, generally rotates within a gap 44 defined between the upper and lower magnet assemblies 40 and 42 of a permanent magnet structure 38 causing the actuator arms 28, in turn, to sweep over the surface of the data storage disks 24. The spindle motor 26 typically comprises a DC motor energized by a power supply 46 and adapted for rotating the data storage disks 24.

The coil assembly 36 and the upper and lower magnet assemblies 40 and 42 of the permanent magnet structure 38 operate in cooperation as an actuator voice coil motor 39 responsive to control signals produced by a servo processor 56. The servo processor 56 controls the direction and magnitude of control current supplied to the voice coil motor 39. The actuator voice coil motor 39 produces a torquing force on the actuator coil frame 34 when control currents of varying direction and magnitude flow in the coil assembly 36 in the presence of a magnetic field produced by the permanent magnet structure 38. The torquing forces imparted on the actuator coil frame 34 cause corresponding rotational movement of the actuator arms 28 in directions dependent on the polarity of the control currents flowing in the coil assembly 36.

The data storage system 20 shown in FIG. 1 preferably employs a closed-loop servo control system for positioning the read/write transducers 27 to specified storage locations on the data storage disk 24. During normal data storage system operation, a servo transducer, generally mounted proximate the read/write transducers, or, alternatively, incorporated as the read element of the transducer assembly 27, is typically employed to read information for the purpose of following a specified track (i.e., track following) and locating (i.e., seeking) specified track and data sector locations on the disk surface 24.

In accordance with one servo technique, embedded servo pattern information is written to the disk 24 along segments extending in a direction generally outward from the center of the disk 24. The embedded servo patterns are thus formed between the data storing sectors of each track 50. It is noted that a servo sector typically contains a pattern of data, often termed a servo burst pattern, used to maintain optimum alignment of the read/write transducers 27 over the centerline of a track 50 when transferring data to and from specified data sectors on the track 50. The servo information may also include sector and track identification codes which are used to identify the location of the transducer assembly 27.

The servo processor 56, which cooperates with read channel electronics 57, regulates the actuator voice coil motor 39 to move the actuator arms 28 and transducers 27 to prescribed track 50 and sector 52 locations when reading and writing data to and from the disks 24. The servo processor 56 is loosely coupled to a disk drive controller 58. The disk drive controller 58 typically includes control circuitry and software that coordinate the transfer of data to and from the data storage disks 24. Although the servo processor 56 and disk drive controller 58 are depicted as two separate devices in FIG. 1, it is understood that the functionality of the servo processor 56 and disk drive controller 58 may be embodied in a single multi-purpose processor, which typically results in a reduced component cost.

A system and method in accordance with the principles of the present invention generally provide for measuring an absolute head-disk clearance using the thermal response of an MR transducer. A system and method according to the present invention is well suited for implementation in-situ a disk drive system of the type described above with reference to FIGS. 1 and 2, it being understood that the invention is not limited to use in a disk drive system nor to use in the particular operating environment described in the above discussion.

An absolute head-disk clearance measurement methodology consistent with the principles of the present invention exploits a phenomenon observed by the inventor by which the rate of change of the thermal response of an MR head changes significantly as the MR transducer transitions from flying above a medium to a state of contacting the medium. In particular, and with reference to FIG. 3, the temperature, and therefore resistance and voltage, of an MR transducer changes significantly as the transducer transitions from a fully flying state to a contacting state relative to a medium. This change in MR transducer signal output can be seen in FIG. 3 as a change in the slope of the curve 61 as the curve 61 passes from regime-1 to regime-2.

Figure 3:
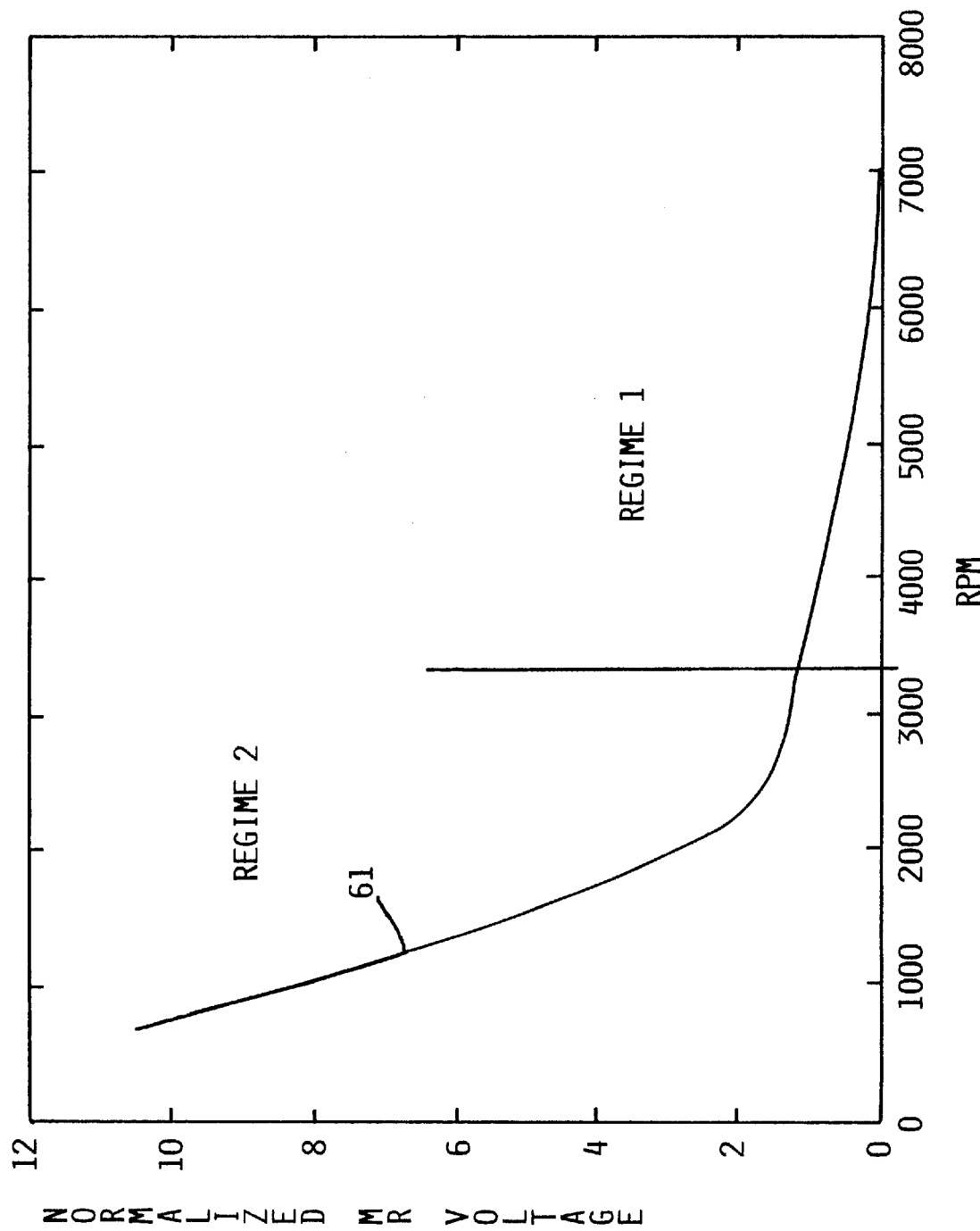
FIG. 3 is a graph of normalized MR element voltage plotted as a function of disk speed (RPM), the slope of the resulting curve varying significantly between two dominant regimes representative of two different thermal transport mechanisms associated with an MR element assembly.

It is noted that the data plotted in FIG. 3 was obtained using a particular head of a test disk drive system. The data was collected by first placing the arm electronics (AE) in an MR resistance measurement mode and then monitoring the MR resistance by measuring the MR voltage at constant MR bias current while the disk velocity was reduced and the heads were held at the inner diameter landing zone radius.

The two regimes, regime-1 and regime-2, represent different thermal transport mechanisms associated with the slider supporting the MR transducer as the slider transitions from a non-contacting flying state to a contacting state. As can be seen in FIG. 3, the slope of curve 61 in regime-1 is nearly constant, which will later be shown to be proportional to the resistance of the MR element and other factors that are essentially constant. In regime-1, as will later be shown, the absolute spacing of the MR transducer relative to the medium surface is not a governing factor. In regime-2, in contrast to regime-1 wherein the slider is flying above the disk, the slider is sliding on the disk surface.

In an embodiment in which the slider exhibits a positive surface profile or crown, contact between the slider and the disk surface induces a forward pitching motion of the slider, due to its positive crown, which greatly reduces the rate at which heat is transferred from the MR element. This pitching motion, coupled with the decrease in disk speed, creates a much steeper slope of curve 61 in regime-2 as compared to that in regime-1.

An absolute head-disk clearance methodology of the present invention monitors the slope or rate of change of curve 61 and detects appreciable changes in the slope of curve 61. Detection of an appreciable increase in the slope of curve 61 may be used to determine the speed at which a particular head is no longer flying above the disk surface without making appreciable contact with the disk surface.

As was stated hereinabove, the two regimes, regime-1 and regime-2, depicted in FIG. 3 represent two different slider/MR element thermal transport mechanisms which will now be discussed in greater detail. With respect to the thermal transport mechanism associated with regime-1, it is assumed that a slider is flying above the disk surface and that any sporadic intermittent contact between the slider and disk surface does not alter this overall assumption.

Assuming a laminar thermal boundary layer between the moving disk and relatively stationary slider, a one-dimensional heat transfer relationship may be developed as follows:

$$k\frac{d^2 T}{dy^2} = -\mu\left(\frac{du}{dy}\right)^2 \quad [1]$$

where, k and $\mu$ represent the thermal conductivity and absolute viscosity of air, respectively, T represents temperature, u represents the velocity of the disk, and y represents the vertical spacing distance between the slider and the disk surface.

Although Equation [1] may be used to derive the thermal gradient in the air film, what is of particular interest is the temperature of the MR element as a function of disk velocity, u. Using a well-known axiom in boundary layer theory, it is assumed that, at the boundary between a solid body and a fluid, the transfer of heat is due solely to conduction.

In view of this axiom, the Nusselt Number, Nu, may be used and defined as follows:

$$Nu = \frac{ql}{k(Tw - T_\infty)} = \frac{ql}{k(T_{MR} - T_{DISK})} \quad [2]$$

where, q represents the heat dissipation in the direction of the disk from the MR element, l represents a characteristic length, such as the width of the MR strip, k represents the thermal conductivity of air, $T_{MR}$ represents the temperature of the MR element, $T_{DISK}$ represents the temperature of the disk, Tw represents wall temperature, and $T_\infty$ represents a fixed reference temperature.

When considering the boundary layers, a relationship between the Nusselt Number, Nu, and the Reynolds Number, Re, may be used, as is characterized in the following equation:

$$nu = \sqrt{Re} \times f_3\left(\frac{x}{l}, P\right) \quad [3]$$

where, P represents local pressure, l represents a characteristic length, such as the width of the MR stripe, and x represents a portion of the characteristic length, l. It is noted that for purposes of the instant analysis, the function $f_3$ is of no interest.

The Reynolds Number, Re, may be defined as follows:

$$\text{Re} = \frac{U_\infty l}{v} = \frac{U_{DISK} l}{v} \quad [4]$$

where, $U_{DISK}$ and v represent the disk velocity and kinematic viscosity of air, respectively. Combining Equation [3] and Equation [4] above gives the needed relationship between MR element and disk temperatures, as is characterized in the following equation:

$$T_{MR} - T_{DISK} = q \Lambda (U_{DISK})^{-0.5} \quad [5]$$

where, $$\Lambda = \sqrt{\frac{vl}{k^2}} \quad [6]$$

and q represents the heat dissipation of the MR element.

Equation [5] above may be restated in a more useful form by noting that the MR element heat dissipation, q, may be expressed in terms of the MR resistance, R, bias current, $i_b$, and the fraction, F, of energy emanating into the air (that is, the fraction of energy not emanating to the shields). Given the above, Equation [5] above may be rewritten as follows:

$$T_{MR} - T_{DISK} = \Lambda i_b^2 RF (U_{DISK})^{-0.5} \quad [7]$$

Figure 4:
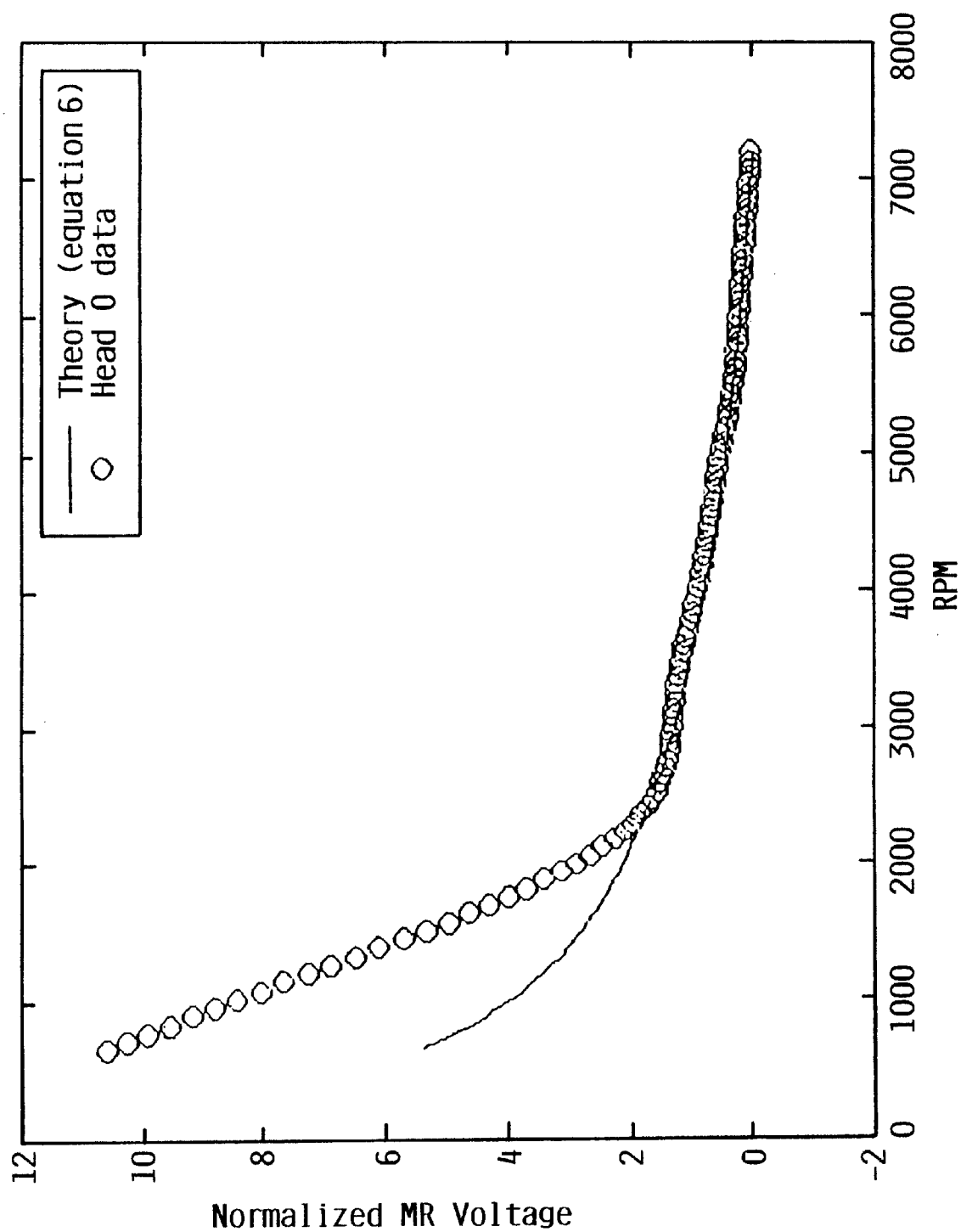
FIG. 4 is a plot of normalized MR element voltage as a function of disk speed (RPM) showing a comparison of theoretical and actual data obtained while performing an absolute head-disk clearance procedure according to the principles of the present invention.

Data produced using Equation [7] above is plotted in FIG. 4, along with the same data points obtained from actual data plotted in FIG. 3. FIG. 4 demonstrates good correlation between theoretical and actual measurements with respect to regime-1.

Using Equation [7] above, an equation which characterizes the MR element voltage may be obtained. MR element voltage may be obtained by multiplying the temperature coefficient of resistance of the MR element, α, by the MR current, $i_b$, and resistance, R, as is characterized by the following equation:

$$E_{MR} = \Lambda F \alpha R^2 i_b^3 (U_{DISK})^{-0.5} \quad [8]$$

Equation [8] above demonstrates that head-disk spacing is not a significant factor with respect to regime-1. The slope of the thermal spindown curve in regime-1 is driven primarily by the MR resistance, R, and current, $i_b$. This observation has been verified experimentally by the inventor.

FIG. 4 also demonstrates a significant departure between theory and experiment when the speed of the disk, measured in RPM, is small compared to nominal disk speed. The departure or error is due to a new thermal regime, namely, regime-2, which is best shown in FIG. 3.

In regime-2, which occurs when the disk velocity is low enough to cause the slider to touch and slide along the disk surface, the dominant heat transfer mechanism is conduction between the slider/MR element and the surrounding air. Unlike regime-1, however, a simple parallel surface geometry between the slider and disk surface cannot be assumed. Rather, in regime-2, pitching or rocking motion of the slider due to contact with the disk surface must be considered.

When a slider with a positive surface profile or crown touches the surface of a moving disk, a pitching motion is induced which causes the slider to pitch forward. This forward pitching motion increases the distance between the MR element and the disk surface. It has been observed experimentally that there is a one-to-one correspondence between the time when the pitching motion begins and the time when the thermal spindown enters regime-2.

As the slider settles onto the disk surface as disk velocity gradually decreases, the forward pitching motion increases and the rate at which heat leaves the MR element into the surrounding air decreases, owing to the lower air velocity adjacent to the MR element. A quasi-static dynamic equation that characterizes this phenomenon is given below as:

$$d = b(P_l - KU_{DISK}) C_f a / K_\theta \quad [9]$$

where, d represents the MR element-to-disk spacing, a represents the distance between the mean plane of the airbearing surface in the center of slider pitch rotation, b represents the distance between the mean plane of the airbearing surface and the location of the MR element, $P_1$ represents the pre-load force on the slider, $KU_{DISK}$ represents the force created by the airbearing which is in the opposite direction of $P_1$, $C_f$ represents the dynamic coefficient of friction between the slider and disk surface, and $K_\theta$ represents slider pitch stiffness.

By taking the first derivative of Equation [9] above with respect to $U_{DISK}$, it can be seen that the rate of increase in MR element-to-disk spacing, d, should be constant in regime-2. Since the rate of heat transfer is linear with respect to changes in MR element-to-disk spacing, as is indicated by Fourier's law of heat conduction, it can be seen that spacing, and not disk velocity, is the likely dominant mechanism impacting changes in MR element temperature, and, thus, MR element voltage.

Having established a theoretical and corresponding experimental foundation for the above-described thermal spindown phenomenon, procedures which exploit this thermal spindown phenomenon may be developed for performing absolute head-disk clearance measurements in accordance with the principles of the present invention. It is important to appreciate that there is no inherent calibration necessary when employing a thermal spindown approach of the present invention, as would otherwise be required if a magnetic spindown technique according to a prior art approach were to be employed.

Instead, many of the significant thermal spindown factors associated with an absolute head-disk clearance measurement procedure according to the present invention do not impact actual head-disk clearance. For this reason, absolute head-disk clearance measurements may be based on a known relationship between the landing velocity and absolute flying height of a slider, and on the disk velocity at which a transition from regime-1 to regime-2 slider behavior is detected.

Figure 6:
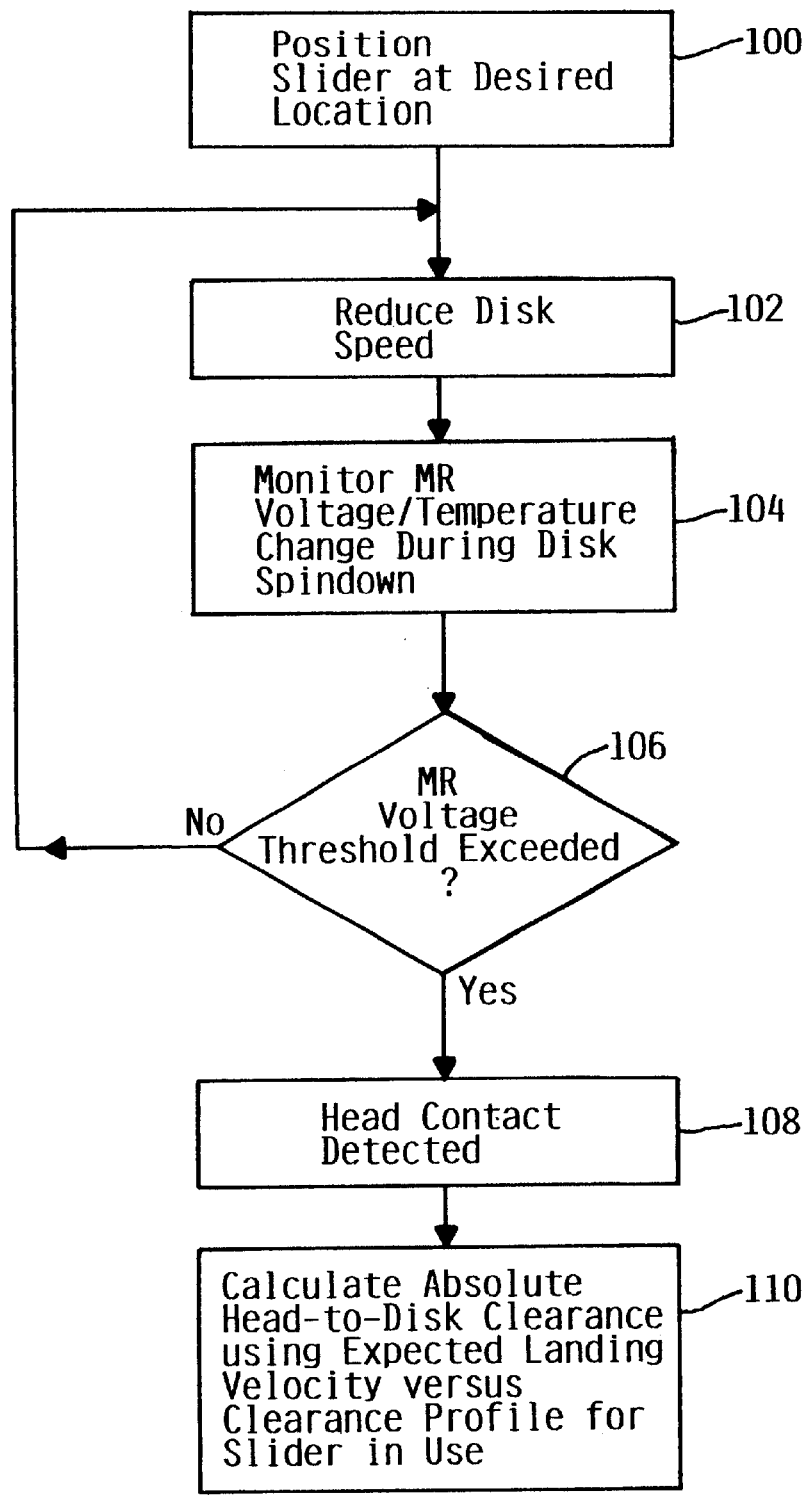
FIG. 6 is a flow diagram of various process steps associated with measuring absolute head-disk clearance in accordance with the principles of the present invention.

Referring now to FIG. 6, there is illustrated various process steps associated with an absolute head-disk clearance measurement methodology in accordance with the principles of the present invention. Initially, a slider is positioned 100 at a desired radial location above the disk surface. As was discussed previously, the disk may, but need not, include a magnetic coating, as the magnetic readback signal component is not needed to measure absolute head-disk clearance according to the present invention.

It is assumed that the slider is initially flying at a desired location above the disk at a given speed so that no appreciable head-disk contact occurs, such as at a full or nominal disk speed. The desired disk location may be a landing zone provided at an inner diameter or outer diameter disk location, or other location on the disk. As was discussed previously, it is not necessary to position the slider over a dedicated track or location of the disk, as is required when conventional head flyheight measurement approaches are employed.

After positioning 100 the slider at the desired disk location, the speed of the disk is reduced 102. While the disk speed is being reduced, the voltage of the MR element is monitored 104. It is understood that resistance, voltage, current, temperature, or other parameter of the MR element which varies as a function of head-disk spacing may be monitored, but that voltage in the instant embodiment is a more convenient parameter to use.

Monitoring 104 the MR element voltage during disk spindown typically involves computing the rate of change of the MR element voltage during disk spindown, which corresponds to computing the slope of curve 61 shown in FIG. 3, for example. The computed rate of change of MR element voltage is compared 106 to a pre-established threshold, such as a maximum MR element voltage rate of change threshold. If the pre-established threshold is not exceeded, disk spindown and monitoring of MR element voltage change continues.

The maximum MR element voltage rate of change threshold may be computed in several ways. In accordance with one embodiment, the rate of change of MR element voltage, or other parameter of the MR element that varies as a function of head-disk spacing, is computed dynamically on a repeated basis during disk spindown 102.

A statistical evaluation of a number of MR element voltage samples is performed to determine whether the rate of change of the MR element voltage indicates a transition from regime-1 slider behavior to regime-2 slider behavior. An appreciable change in MR element voltage associated with a most recent MR element voltage sample relative to previous MR element voltage samples typically indicates the beginning of regime-2 slider behavior and, thus, appreciable contact 108 between the slider and disk surface.

By way of example, a series of MR element voltage rate of change (i.e., slope) computations made during initial disk spindown 102 will typically indicate that the MR element voltage changes at a constant rate relative to the rate of disk speed reduction. This relationship between MR element voltage rate of change and disk velocity change is characteristic of regime-1 slider dynamics, as is indicated by the constant slope of curve 61 in FIG. 3. As disk spindown 102 continues, MR element voltage slope computations are repeatedly compared against previously computed voltage slope values to determine whether a new data point deviates significantly from those generated by previous computations.

For example, an appreciable change of a given MR element voltage data point may represent a 10% or greater deviation from slope computations associated with previously acquired MR element voltage data. A significant deviation in MR element voltage or rate of voltage change indicates a transition from regime-1 to regime-2 slider dynamics and, consequently, detection 108 of head-disk contact.

At the time the transition from regime-1 to regime-2 is detected, which represents appreciable contact 108 between the slider and disk surface, the disk speed is stored and used to calculate 110 absolute head-disk clearance. In particular, the disk velocity at which an appreciable increase in the rate of change of MR element voltage is detected is used to determine the absolute head-disk clearance for the particular head at full or nominal speed. A head-disk clearance profile developed specifically for each head is used to relate a regime-1/regime-2 transition velocity to an absolute head-disk spacing at a full or nominal disk velocity.

Figure 5:
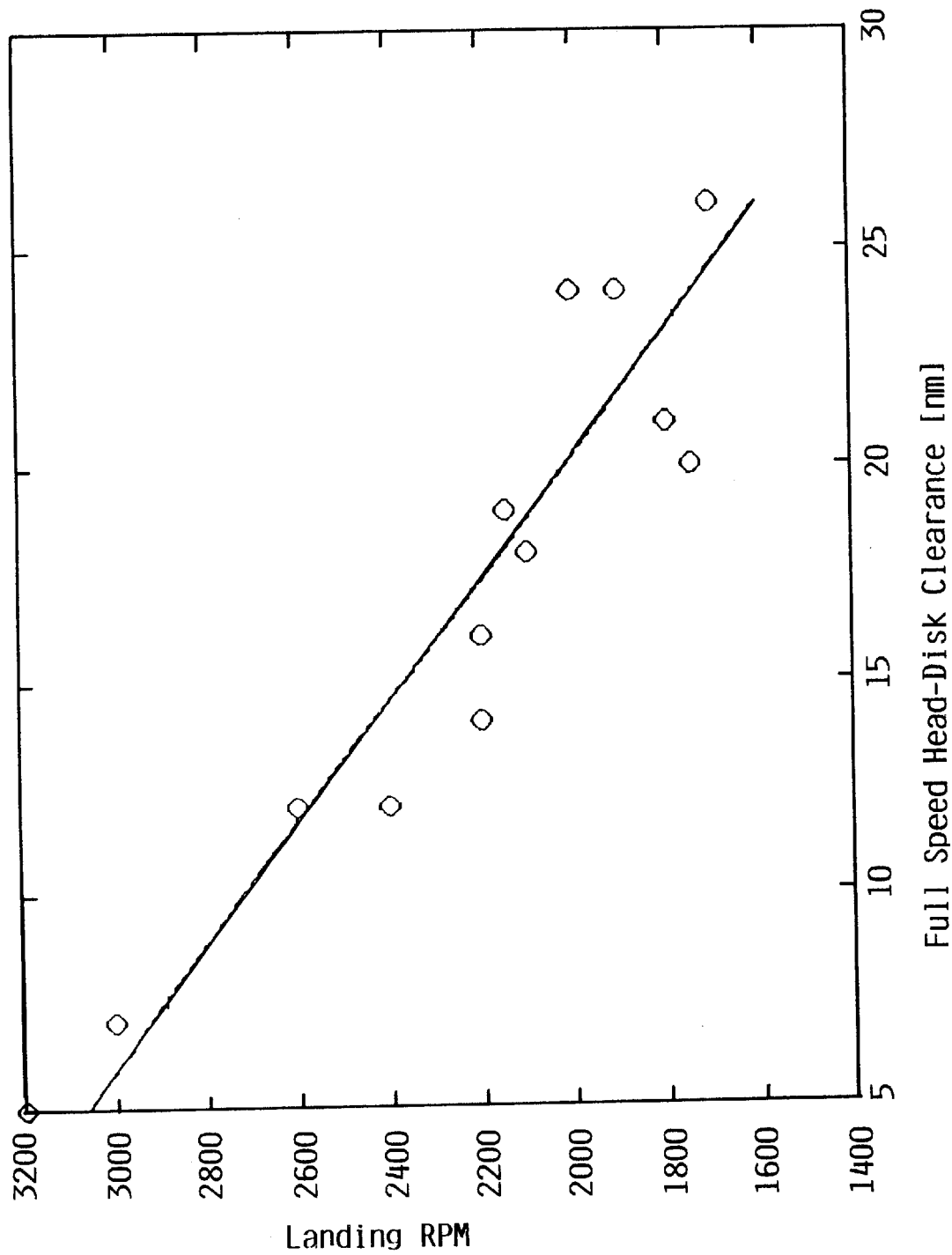
FIG. 5 is a plot of disk landing speed (RPM) as a function of full speed head-disk clearance which is developed for a particular head of a given disk drive system.

The clearance profile illustrated in FIG. 5, for example, graphically depicts a relationship between nominal slider flying height at full disk speed and slider landing velocity for the type of slider being used in a particular disk drive family. This general relationship between full speed slider flyheight and landing velocity is well-understood, and can be obtained in several ways, such as through use of airbearing modeling, empirically through use of known HRF techniques or through use of acoustic emission transducers, for example. In the case of the relationship depicted in FIG. 5, the landing velocity data was determined by use of known HRF methods.

A clearance profile which can be used to calculate full speed absolute head-disk clearance may be estimated on the basis of landing velocity or, alternatively, on the basis of takeoff velocity by using a simple linear relationship, as is indicated by the straight line in FIG. 5. It is understood, however, that actual landing zone roughness will influence the landing velocity. Since disk surface roughness is typically dominated by laser bumps with good height control, the landing velocity is dominated by the actual head flying height. In future disk drive systems, very smooth disks will likely be used which will have even tighter disk roughness distributions.

For purposes of illustration, and with reference to FIGS. 3 and 6, it may be assumed that a disk is rotated at a nominal speed (e.g., full speed) of 7,200 RPM. MR element voltage change computations are made while the speed of the disk is reduced from the nominal disk speed of 7,200 RPM. As is shown in FIG. 3, the slope of curve 61 changes appreciably at about 3,200 RPM. Thirty-two hundred RPM, in this illustrative example, represents the speed at which the slider subjected to the absolute head-disk clearance measurement procedure transitions from regime-1 to regime-2 behavior.

The disk velocity value of 3,200 RPM is then applied to the clearance profile shown in FIG. 5. As can be seen in FIG. 5, a disk landing speed of 3,200 RPM corresponds to a full speed absolute head-disk clearance of 5 nm. In other words, the particular head under evaluation will be flying at approximately 5 nm above the disk surface at a nominal disk speed of 7,200 RPM during normal operation. In this case, a full speed flyheight of 5 nm may be indicative of a suspect head, especially if this and other heads for a given disk drive system are designed to have a clearance of approximately 20–40 nm under nominal conditions.

It is noted that the ambient pressure within the disk drive system has a significant influence on head flyheight. In cases of reduced pressure, such as when operating the disk drive system at high altitudes, a comparison between the full speed flyheight of a given head relative to that of other heads may be used as a basis for detecting a suspect head.

By way of further illustration, and assuming that a given slider experiences a transition between regime-1 and regime-2 at approximately 2,400 RPM, the head-disk clearance associated with this head at full speed (i.e., 7,200 RPM) is approximately 12 nm, which is obtained directly from the data plotted in FIG. 5. As a further example, a particular head which experiences an appreciable change in MR element voltage at 1,800 RPM will realize a nominal flyheight of approximately 20 nm at full disk speed.

Figure 7:
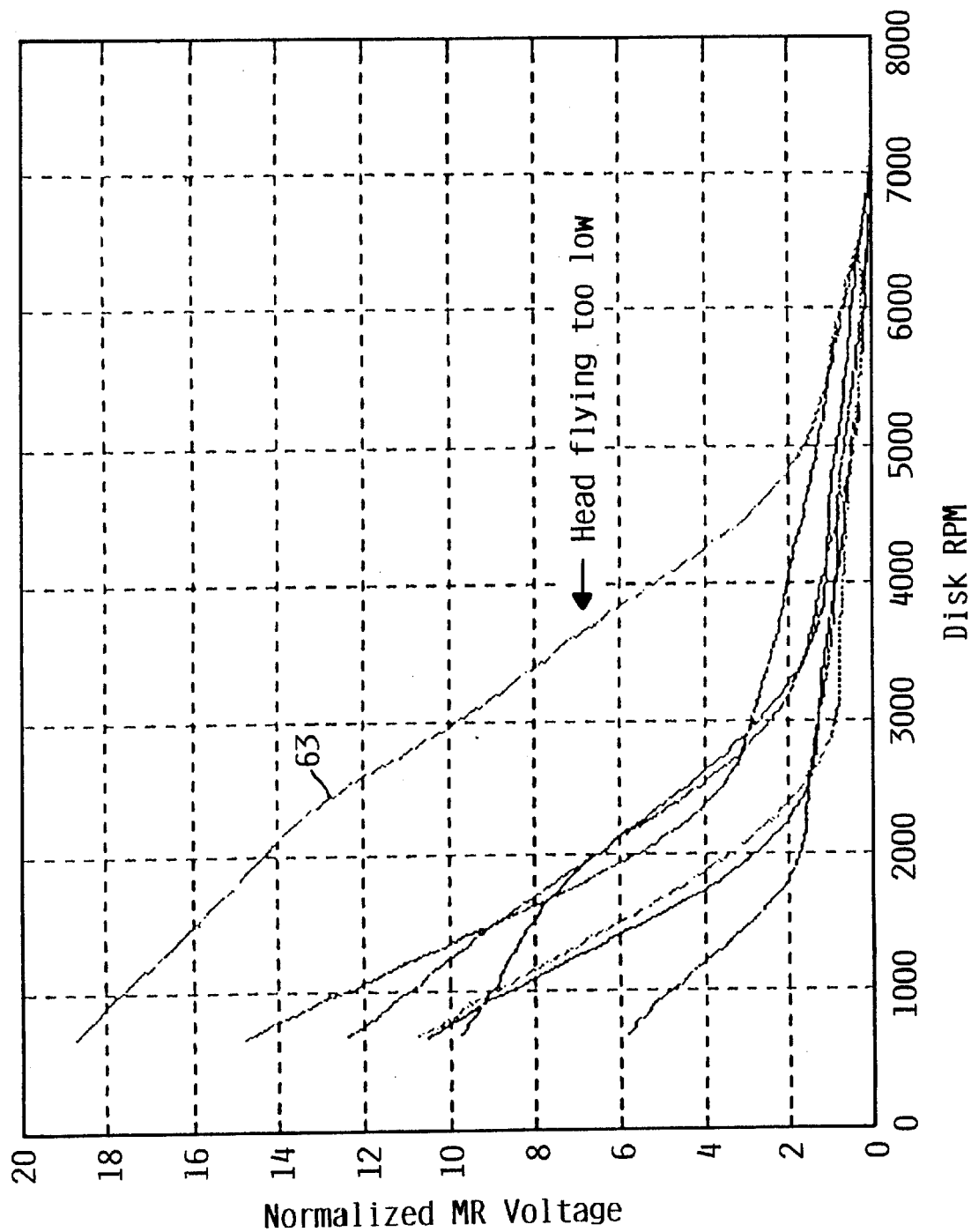
FIG. 7 shows thermal spindown curves for seven different sliders of a particular disk drive system obtained in accordance with the principles of the present invention.

FIG. 7 shows a number of thermal spindown curves for seven different sliders of a particular disk drive system. One slider, which is characterized by curve 63, appears to be in near contact with the disk surface at full/nominal disk speed (i.e., 7,200 RPM in this illustrative example). This conclusion is based on the observation that thermal regime-2 behavior is detected at about 4,500 RPM for this particular slider.

Based on the linear fit shown in FIG. 5, this low-flying head has an estimated clearance of less than 1 nm. In this illustrative example, it can be appreciated that detecting this low-flying condition is extremely important to the long-term reliability of the subject disk drive system.

In order to automate the process of identifying thermal regime-2 slider behavior in the acquired thermal spindown data, a simple MR element voltage threshold may be established based on the slope of the thermal voltage signal, as previously discussed. Use of the thermal voltage slope approach advantageously enhances detection of head-disk contact, since the slope in regime-2 is many times greater than the slope associated with the thermal voltage in regime-1, as can clearly be seen in FIG. 3.

A three-point finite impulse response (FIR) filter may be used to enhance identification of the starting point of regime-2 in the acquired thermal spindown data. By way of example, a three-point FIR filter programmed to operate as a least-squares linear slope predictor may have coefficients of [+0.5, 0, −0.5].

Figure 8:
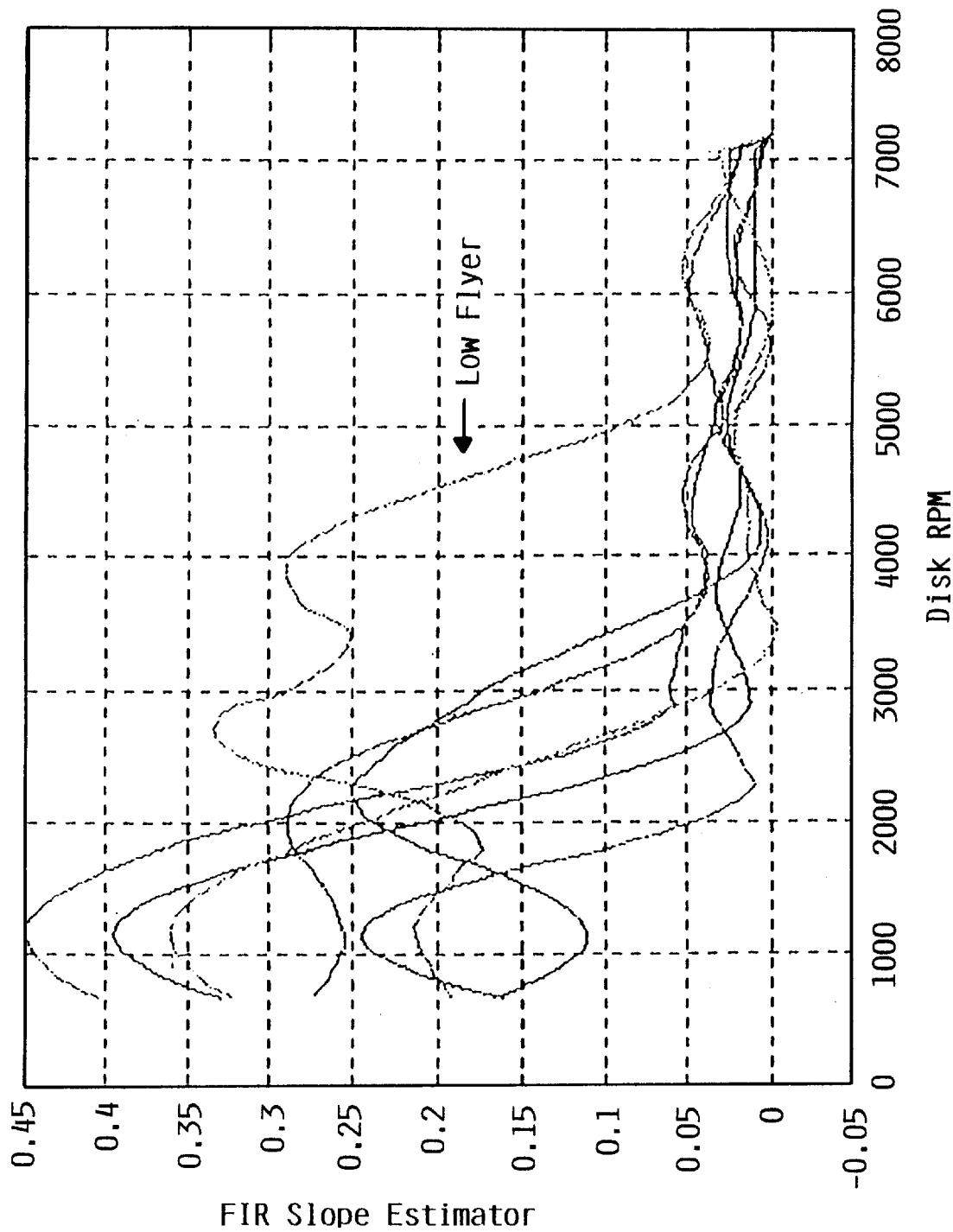
FIG. 8 is a plot of the data shown in FIG. 6 subject to finite impulse response (FIR) filtering.

Taking the same data shown in FIG. 7 and applying this data to the FIR filter having coefficients of [+0.5, 0, −0.5] results in the production of the data plotted in FIG. 8. A clear stratification between sliders flying with sufficient head-disk clearance and those flying with insufficient head-disk clearance is evident in the filtered data plotted in FIG. 8. An appropriately programmed digital filter, such as the above-described programmed FIR filter, may be used to pre-process thermal spindown data before a threshold is applied.

By setting a threshold of 0.1 on the vertical axis of FIG. 8, for example, head-disk clearances can be estimated. The particular threshold used is based primarily on the type of slider employed and the MR bias current. It can be seen, for example, that each of the curves in FIG. 8 represents a unique function of disk speed (RPM), and that all of the curves are monotonically increasing within the range of about 0.075 to about 0.12. A threshold may be established to fall within this range (e.g., 0.1) for purposes of accurately estimating head-disk clearance and reliably detecting low flying heads.

In accordance with another embodiment, the thermal spindown technique discussed hereinabove may be used to characterize the slider crown. Referring again to FIG. 3, the slope of curve 61 in thermal regime-2 may be viewed as being dependent on the profile of the slider crown. If the slider is completely flat or has a negative crown, it is much less likely that any slider pitching motion will occur in regime-2, and thus the curve 61 will be much flatter. The curve 61 associated with such a slider will still have some slope, however, because of frictional heating as a result of sliding.

Sliders which have positive crowns are associated with curves 61 having steeper slopes in thermal regime-2. As such, the slope of curve 61 may be used to characterize the crown of a given slider, such as in terms of profile or change in profile over time.

In accordance with yet another embodiment, the lubricity of the head-disk interface (HDI) may be evaluated using the above-described thermal spindown technique. For a given slider with a certain crown, any significant increase in the slope of curve 61 in regime-2 can result from the lack of a sufficient amount of lubricant which, of course, results in increased frictional heating of the slider/MR transducer during head sliding. Thus, the slope of curve 61 in regime-2 may be monitored for all heads, and this data may be used as a measure of the lubricity of the head-disk interface. The slope of curve 61 may be estimated, such as by use of a linear fit approach, and then compared to the estimated slope over time.

The slope of curve 61 may also be measured at different disk radii. The radial distribution of a lubricant is due, in part, to centrifugal and other forces that tend to make the lubricant spin off toward the outer diameter of the disk. This movement of the lubricant may take several months, and must eventually be replenished. An example of an in-situ lubricant replenishment system is disclosed in commonly assigned U.S. Pat. No. 5,305,301, which is hereby incorporated herein by reference in its entirety.

The servo feedback for the system disclosed in U.S. Pat. No. 5,305,301 is ideally head-disk friction, which can be estimated using the slope of curve 61 in regime-2. Of course, the point of transition from regime-1 to regime-2 may also change as a function of lubricity. This transition point may be estimated by using an estimate of the y-intercept derived from the linear fit mentioned previously.

In accordance with another embodiment, the information obtained from a thermal spindown according to the principles of the present invention may be used to adjust disk speed or some other controlling means, such as a slider pre-load or pitch angle, in order to keep the heads flying at some desired flying height. For near-contact recording, for example, it is desirable to keep the sliders of a disk drive system as close to the disk surface as possible, without causing the sliders to slide on the disk. Since the y-intercept discussed in the previous paragraph identifies this flying-to-sliding transition, the sliders may be set to remain in this regime regardless of altitude, temperature, or age of the disk drive system.

An absolute head-disk clearance methodology according to the principles of the present invention employs thermal spindown data as a basis for estimating absolute head-disk clearance. The thermal spindown approach of the present invention advantageously avoids many of the significant problems associated with magnetic clearance methods, such as known HRF techniques.

In particular, the thermal spindown methodology of the present invention obviates the need to perform time consuming track alignment. Also, a thermal spindown approach of the present invention is not affected by the low pole of the arm electronics (e.g., pre-amplification circuitry). The thermal spindown techniques of the present invention may be performed in-situ a disk drive by locating the sliders at a known location, such as against a crash stop, switching the arm electronics into MR resistance measurement mode, monitoring the MR element voltage during a disk spindown procedure, and calculating the clearance based on the expected landing velocity versus clearance profile for the particular slider used in the disk drive under evaluation.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What we claim is:

1. A method of measuring absolute clearance between a magnetoresistive (MR) transducer comprising an MR element and a medium using a thermal response of the MR element, the medium moving relative to the MR transducer, the method comprising:

producing, using the MR element, a signal that varies as a function of clearance between the MR element and the medium, the signal comprising a thermal component representing a thermal response of the MR element;

reducing a velocity of the medium relative to the MR transducer;

monitoring, while reducing the medium-transducer velocity, a rate of change of the signal; and computing, for a nominal medium-transducer velocity, absolute clearance between the MR transducer and the medium using the rate of change of the signal.

2. The method of claim 1, wherein computing absolute clearance between the MR transducer and the medium further comprises determining a transition velocity at which the rate of change of the signal exceeds a pre-established threshold and using the transition velocity to compute the absolute clearance between the MR transducer and the medium for the nominal medium-transducer velocity.

3. The method of claim 2, wherein monitoring the rate of change of the signal comprises performing a plurality of rate of change computations using the signal to establish the pre-established threshold.

4. The method of claim 2, wherein the transition velocity is representative of a medium-transducer velocity at which the rate of change of the signal exceeds the pre-established threshold by about 10 percent or more.

5. The method of claim 2, wherein the transition velocity is representative of a transition from a first thermal transport mechanism associated with the MR transducer to a second thermal transport mechanism associated with the MR transducer.

6. The method of claim 2, wherein the transition velocity is representative of a medium-transducer velocity at which appreciable contact occurs between the transducer and the medium.

7. The method of claim 1, wherein computing absolute clearance between the MR transducer and the medium further comprises associating a transition velocity at which the rate of change of the signal exceeds a pre-established threshold with an absolute clearance value obtained using a clearance profile associated with the MR transducer.

8. The method of claim 7, wherein the clearance profile is representative of a relationship between landing or takeoff velocity of the MR transducer and associated transducer-medium clearance.

9. The method of claim 1, wherein the signal is representative of a resistance or voltage of the MR element that varies as a function of clearance between the MR element and the medium.

10. The method of claim 1, further comprising biasing the MR element using a constant current.

11. The method of claim 1, further comprising adjusting the medium-transducer velocity or a characteristic of a slider that supports the MR transducer to maintain a desired clearance between the MR transducer and the medium.

12. The method of claim 1, further comprising:
determining a transition velocity at which the rate of change of the signal exceeds a pre-established threshold; and
determining a state of lubricity between a slider that supports the MR transducer and the medium using the rate of change of the signal for medium-transducer velocities lower than the transition velocity.

13. The method of claim 1, further comprising;
determining a transition velocity at which the rate of change of the signal exceeds a pre-established threshold; and
characterizing a surface profile of a slider that supports the MR transducer using the rate of change of the signal for medium-transducer velocities lower than the transition velocity.

14. An apparatus for measuring absolute clearance between a slider and a medium moving relative to the slider, the apparatus comprising:

a magnetoresistive (MR) transducer comprising an MR element and supported by the slider, the MR transducer producing a signal that varies as a function of clearance between the MR element and the medium, the signal comprising a thermal component representing a thermal response of the MR element;

a controller that controls a velocity of the medium relative to the slider, the controller reducing the velocity of the medium relative to the slider; and a processor, coupled to the controller and MR transducer, that computes a rate of change of the signal during reduction of the medium-slider velocity and determines a medium-slider threshold velocity at which the rate of change of the signal exceeds a pre-established threshold, the processor determining, for a nominal medium-slider velocity, absolute clearance between the slider and the medium using the threshold velocity and a clearance profile associated with the slider.

15. The apparatus of claim 14, wherein the processor performs a plurality of rate of change computations using the signal to establish the pre-established threshold.

16. The apparatus of claim 14, wherein the transition velocity is representative of a medium-slider velocity at which the rate of change of the signal exceeds the pre-established threshold by about 10 percent or more.

17. The apparatus of claim 14, wherein the transition velocity is representative of a medium-slider velocity at which appreciable contact occurs between the slider and the medium.

18. The apparatus of claim 14, wherein the clearance profile is representative of a relationship between landing or takeoff velocity of the slider and associated slider-medium clearance.

19. The apparatus of claim 14, wherein the signal is representative of a resistance or voltage of the MR element that varies as a function of clearance between the slider and the medium.

20. The apparatus of claim 14, further comprising a programmable filter, coupled to the processor, that filters the rate of signal change computations produced by the processor.

21. The apparatus of claim 20, wherein the programmable filter comprises a finite impulse response (FIR) filter.

22. The apparatus of claim 20, wherein the programmable filter is programmed to perform a least-squares linear fit using the rate of signal change computations produced by the processor.

23. The apparatus of claim 14, wherein the processor cooperates with the controller to adjust the medium-slider velocity or a characteristic of the slider to maintain a desired clearance between the slider and the medium.

24. The apparatus of claim 14, wherein the processor determines a state of lubricity between the slider and the medium using the rate of change of the signal for medium-slider velocities lower than the transition velocity.

25. The apparatus of claim 14, wherein the processor characterizes a surface profile of the slider using the rate of change of the signal for medium-slider velocities lower than the transition velocity.

26. A data storage system, comprising:
a data storage disk mounted to a motor;
at least one magnetoresistive (MR) transducer comprising an MR element, the MR transducer supported by a slider and producing a signal that varies as a function of clearance between the slider and the disk, the signal comprising a thermal component representing a thermal response of the MR element;

a movable support structure, the support structure supporting the slider and moving slider across the disk;

a controller, coupled to the motor, that controls a velocity of the disk relative to the slider, the controller reducing the velocity of the disk relative to the slider; and a processor, coupled to the controller and MR transducer, that computes a rate of change of the signal during reduction of the disk-slider velocity and determines a disk-slider transition velocity at which the rate of change of the signal exceeds a pre-established threshold, the processor determining, for a nominal disk-slider velocity, absolute clearance between the slider and the disk using the transition velocity and a clearance profile associated with the slider.

27. The system of claim 26, wherein the processor performs a plurality of rate of change computations using the signal to establish the pre-established threshold.

28. The system of claim 26, wherein the transition velocity is representative of a disk-slider velocity at which the rate of change of the signal exceeds the pre-established threshold by about 10 percent or more.

29. The system of claim 26, wherein the transition velocity is representative of a disk-slider velocity at which appreciable contact occurs between the slider and the disk.

30. The system of claim 26, wherein the clearance profile is representative of a relationship between landing or takeoff velocity of the slider and associated slider-disk clearance.

31. The system of claim 26, wherein the signal is representative of a resistance or voltage of the MR element that varies as a function of clearance between the slider and the disk.

32. The system of claim 26, further comprising a programmable filter, coupled to the processor, that filters the rate of signal change computations produced by the processor.

33. The system of claim 26, wherein the programmable filter is programmed to perform a least-squares linear fit using the rate of signal change computations produced by the processor.

34. The system of claim 26, wherein the processor cooperates with the controller to adjust the disk-slider velocity or a characteristic of the slider to maintain a desired clearance between the slider and the disk.

35. The system of claim 26, wherein the processor determines a state of lubricity between the slider and the disk using the rate of change of the signal for disk-slider velocities lower than the transition velocity.

36. The system of claim 26, wherein the processor characterizes a surface profile of the slider using the rate of change of the signal for disk-slider velocities lower than the transition velocity.

* * * * *